March 25, 1941.  H. A. MULVANY  2,236,006
METHOD FOR DRYING MATERIALS
Filed Jan. 4, 1939
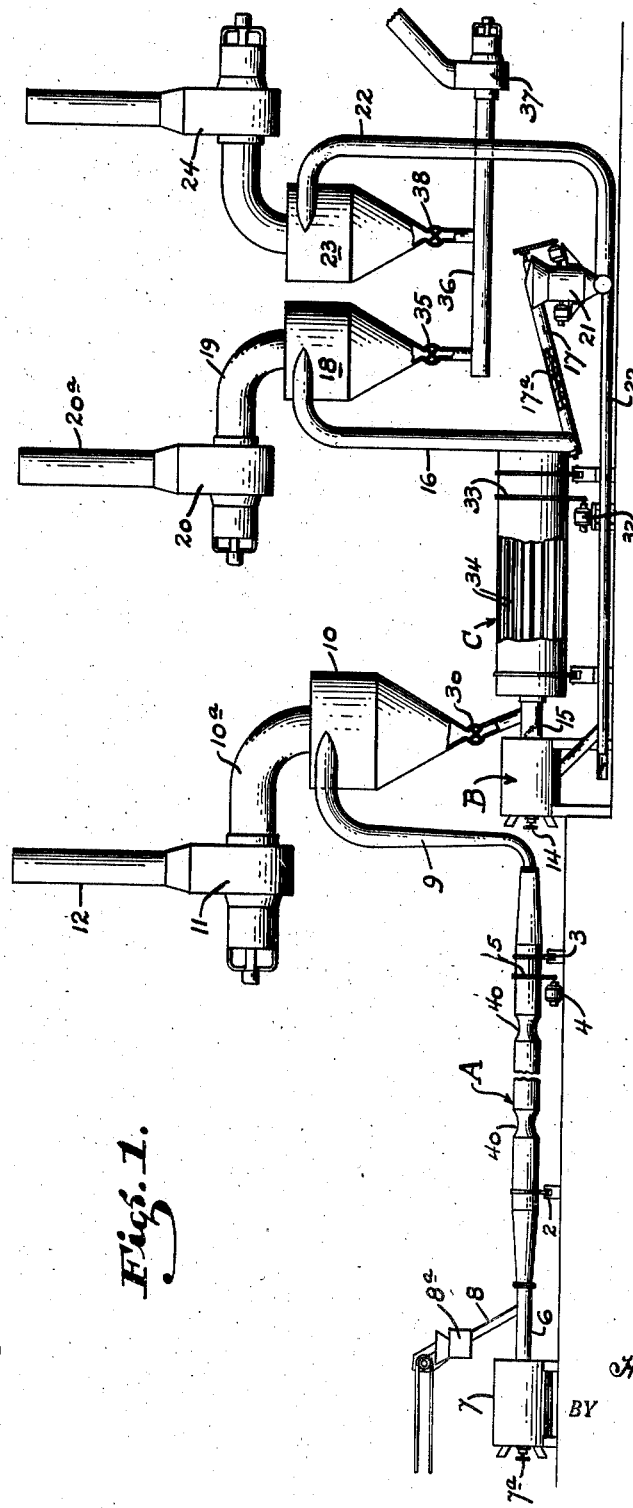
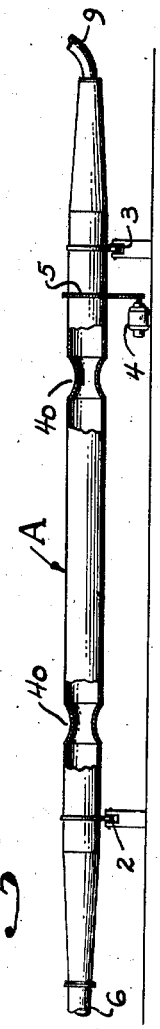
INVENTOR.
Harry A. Mulvany.
BY
Chas. E. Townsend.
ATTORNEY.

Patented Mar. 25, 1941

2,236,006

UNITED STATES PATENT OFFICE 2,236,006

METHOD FOR DRYING MATERIALS

Harry A. Mulvany, Berkeley, Calif.

Application January 4, 1939, Serial No. 249,214

4 Claims. (Cl. 34—24)

The importance of drying foodstuffs, such as alfalfa hay, in a manner to conserve their nutriment values is recognized today. The important nutritional element of alfalfa hay is carotene, which is the precursor of vitamin "A." Carotene, with its vitamin "A" content, is very readily destroyed. For instance, holding it in a water-saturated atmosphere at a high temperature for a few moments will completely destroy this valuable product. Similarly, if alfalfa hay is air-dried in the sun, the carotene content often drops to 10 milligrams per hundred-cubic centimeter sample. I have found that if alfalfa hay is artificially and rapidly dried as soon after cutting as possible, the carotene content in the same type alfalfa will run between 40 and 51 milligrams per hundred cubic centimeter sample, or roughly more than four times that of natural air- or sun-dried alfalfa; and the vitamin "A" content will be proportionately high, as 0.6 of a microgram of carotene is equal to one unit of vitamin "A."

The object of the present invention is to provide a method whereby alfalfa and similar materials may be dried with the smallest possible loss in nutriment value; to provide a method wherein high temperatures may be employed to promote rapid drying of alfalfa without material detriment to the carotene, and therefore, to its vitamin "A" content; to provide a method in which the leaves of the alfalfa, which dry much more quickly than the stems, are automatically broken off, separated and removed therefrom when dried to the proper degree; and further, to provide a method in which the stems are shredded and subjected to a further drying operation to reduce the moisture content to the same degree as the leaves which have previously been removed.

The apparatus employed is shown by way of illustration in the accompanying drawing, in which Fig. 1 is a diagrammatic side elevation of the apparatus; and Fig. 2 is an enlarged view of the first drying cylinder.

Referring to the drawing in detail, and particularly to Fig. 1, A indicates a cylinder approximately 4 feet in diameter and 100 feet long. The cylinder is mounted on roller bearings 2 and 3 disposed at opposite ends, and is continuously driven when in operation by a motor 4 and gears 5. One end of the cylinder is connected through a pipe 6 with a hot air furnace 7 operated by a burner 7a, and connected with pipe 6 is a pipe 8 which in turn is connected with a chopper 8a, whereby the alfalfa or other material to be dried is reduced in length sufficiently to permit it to be picked up by air and carried through cylinder A at comparatively high velocity. The opposite end of the cylinder is connected through a pipe 9 with a cyclone-type separator 10, and this is in turn connected through a pipe 10a with the suction side of a motor driven blower 11 which discharges the air to the atmosphere through a pipe or stack 12.

B indicates a second hot air furnace operated by a burner 14. Connected with this furnace through a pipe 15 is a revolving cylinder C, approximately 9 feet in diameter and 30 feet long, and connected with the opposite end of cylinder C are two discharge pipes 16 and 17. Pipe 16 removes the major portion of the leaves and is connected with a cyclone separator 18, which in turn is connected through pipe 19 with the suction side of a motor driven blower 20 similar to the blower 11. Pipe 17 contains a screw or similar conveyor 17a which removes the stems from cylinder C and delivers them to a shredding machine 21. This in turn discharges into a pipe line 22, one end of which is connected with the furnace B, the opposite end being connected with a cyclone separator 23, which in turn is connected with the suction side of a motor-driven blower 24 similar to the blowers 11 and 19.

In actual practice a continuous flow of hot air is maintained through furnace 7, cylinder A, pipe 9 and the cyclone separator 10, by the blower 11. The actual air velocity maintained is about 5000 feet per minute. The air from the furnace enters the forward end of cylinder A at a temperature of around 1800 F., but as the moisture content of the chopped alfalfa is about 80%, the temperatures of the air drops rapidly, as it discharges through the stack 12 at about 230° F. The total distance traveled by the alfalfa from the point of intake 8 to the cyclone separator 10 is about 130 feet. This takes place in a fraction of a minute, but even so, the moisture content drops to approximately 35%. Due to the short time of contact with the air, it is possible to employ the high temperatures specified without detrimental effect upon the nutriment value.

In the bottom of the cyclone separator 10 is mounted a continuously rotating feeder 30, which discharges the partially dried alfalfa into pipe 15, which feeds the cylinder C. A continuous flow of air is also here maintained by the blower 20, but a much lower temperature and air velocity are maintained. The air from the furnace enters cylinder C at a temperature of about 800° F., and discharges through the stack 20a at about 230° F. Cylinder C is continuously rotated by a motor 32 through gears 33. Flights 34 are secured on the interior surface of the cylinder, and the alfalfa is tumbled over and over during its passage therethrough. The leaves will obviously dry more rapidly than the stems, and as they dry they break free from the stems and are carried by the air through pipe 16 into the separator 18. The moisture content in the leaves drops to about 10% when they break off, and they are delivered in this condition by a rotary feeder 35 into a pipe 36 which is connected with the suction side of a blower 37, which in turn discharges to a mill, a storage bin, etc., depending upon the final product desired.

The stems are too heavy to be carried along with the leaves, and as such discharge into the conveyor 17, whereby they are delivered to the shredder 21. The moisture content of the stems is about 35% when entering the cylinder C, and drops to about 25% before delivery to the shredder. In the shredded condition they enter the pipe line 22 where they are again subjected to heat. The moisture content is reduced to about 10% when the separator 23 is reached. A rotary feeder 38 here discharges the dry shredded stems into the same line or pipe 36, if the leaves and stems are to be mixed or ground; or they may be discharged into a separate line if the leaves and stems are to be separately treated.

One of the important features of the present invention is the separation of leaves and stems in the cylinder C. This is automatically accomplished, as the leaves dry more quickly than the stems, and due to the tumbling action to which they are subjected, break off and are carried away by the air current produced and maintained by the blower 20. The air velocity, which is sufficient to carry away the leaves, is not sufficient to carry off the heavier stems, hence these will gradually work toward the discharge end and will be separately removed by the conveyor 17.

The next important feature is the shredding of the stems, as this opens or spreads them apart sufficiently to permit the excess moisture still retained to be evaporated when again exposed to the drying action of heated air. By this method it becomes possible to dry or reduce the moisture content of the stems to any point or percentage desired, without over-drying of the leaves and without exposure to heat for more than a short period at any time. If continuous exposure to heat during the entire drying operation were necessary, the nutritional value would be detrimentally affected, or in other words materially reduced, but with only momentary exposure to heat as drying progresses, drying is rapidly accomplished without detrimentally affecting the nutriment value, and high temperatures may at the same time be employed. The importance of only momentary exposure to high temperature has been emphasized, and as the highest temperature is employed in the first stage of drying, to wit, in the cylinder A, the chopped material must pass rapidly therethrough. To insure rapid travel or movement of the material with the high-velocity hot air current passing through the tube, one or more restrictions similar to a venturi, such as shown at 40, are formed in tube A (see particularly Fig. 2). These restrictions step up the velocity of the air when passing therethrough, and as such produce a series of jets which blast the material along and prevent it from lodging and adhering to the inner surface of the tube.

In the tube C, such restrictions are not necessary, as the material is tumbled over and over by the flights formed on the inner surface, and is thus prevented from adhering.

By this method the material is subjected to three separate and intermittent stages of drying. The time of passage through each stage is actually only a a few seconds, and it is for this reason that the high temperatures specified may be employed without detrimentally affecting the nutriment value of the material.

While certain features of the invention have been more or less specifically described and illustrated, I nevertheless wish it understood that changes may be resorted to within the scope of the claims presented.

Having thus described and illustrated my invention, what I claim and desire to secure by Letters Patent is—

1. A method of drying green chopped alfalfa and similar material, which consists in gradually drying the material by passing it through a plurality of drying chambers, subjecting the green material to hot dry air in a first chamber to remove the major portion of the moisture content, removing the material from said chamber and introducing it to a second chamber, again subjecting the material to the drying action of hot air, completing the drying of the leaves in said second chamber, subjecting the leaves and stems to agitation sufficient to break off the dried leaves, separating the leaves and stems and removing them separately, delivering the stems to a shredding machine, introducing the shredded stems to a third drying chamber, again subjecting the material to the drying action of dry hot air to complete drying, and then removing the shredded material.

2. A method of drying alfalfa and similar material, which consists in subjecting the green material to a chopping action to reduce it to short lengths, delivering the chopped material into a hot air stream flowing at sufficient velocity to pick up and carry the chopped material, separating the material from the air stream when the moisture content has been reduced to a predetermined point, delivering the material into a second heated air stream and at the same time subjecting the material to a tumbling action to break off and remove the leaves from the stems, separately removing the leaves when the moisture has reached a predetermined low percentage, separately removing the stems after the moisture content has been further lowered, and delivering the stems to a shredder, delivering the shredded stems to a third heated air stream where the moisture content is reduced to a predetermined low percentage, and then removing the shredded stems.

3. A method of drying alfalfa and similar material, which consists in subjecting the green material to a chopping action to reduce it to short lengths, subjecting the chopped material to a drying action to substantially reduce the moisture content, subjecting the material to a second drying action where the moisture in the leaves is reduced to the final point, and at the same time subjecting the material to a tumbling action to break the leaves from the stems, separately removing the leaves, separately removing the stems, subjecting the stems to a shredding action, subjecting the shredded stems to a drying action to reduce the moisture to the final point, and then removing the shredded stems.

4. A method of drying alfalfa and similar material, which consists in subjecting the green material to a chopping action to reduce it to short lengths, subjecting the chopped material to a drying action to substantially reduce the moisture content, subjecting the material to a second drying action where the moisture in the leaves is reduced to the final point, and at the same time subjecting the material to a tumbling action to break the leaves from the stems, separately removing the leaves, separately removing the stems, subjecting the stems to a shredding action, subjecting the shredded stems to a drying action to reduce the moisture to the final point, removing the shredded stems and mixing them with the previously removed leaves, and then subjecting the leaves and shredded stems to a milling action to produce flour.

HARRY A. MULVANY.